United States Patent Office 2,792,382
Patented May 14, 1957

2,792,382

CONDENSATION PRODUCTS OF ALKENE OXIDES AND HYDROXYLATED POLYMERS OF CONJUGATED DIENES AND THEIR PREPARATION

Lee O. Edmonds, Bartlesville, Okla., assignor to Phillips Petroleum Company, a corporation of Delaware No Drawing. Application November 26, 1952, Serial No. 322,827

10 Claims. (Cl. 260—94.7)

This invention relates to products of condensation of alkene oxides and hydroxylated polymers of conjugated dienes. In one aspect this invention relates to a process for the condensation of alkene oxides and hydroxylated polymers of conjugated dienes. In another aspect this invention relates to the plasticization of organic plastic substances containing unsaturated carbon to carbon bonds. In another aspect, this invention relates to organic plastic substances containing incorporated therewith a product of condensation of an alkene oxide and a hydroxylated polymer of a conjugated diene. In still another aspect, this invention relates to products of condensation of alkene oxides and hydroxylated liquid polymers of conjugated dienes, and to their preparation, the said liquid polymers being substanstially free from dissolved and/or suspended solid polymers. In one specific aspect, this invention relates to products of condensation of ethylene oxide and hydroxylated liquid polymers of 1,3-butadiene, and to their preparation.

I have discovered that hydroxylated polymers of conjugated dienes can be condensed with alkene oxides to provide condensation products having especial utility as plasticizers for organic plastic substances containing unsaturated carbon-to-carbon bonds, i. e., of resins, natural rubber, and synthetic rubber-like materials, and which can also be employed as additives for lubricating oils and greases.

In accordance with this invention a hydroxylated polymer of a conjugated diene is condensed with an alkene oxide in the presence of an alkaline catalyst material to provide resulting condensation products as new compositions. In one embodiment of this invention an organic plastic substance is plasticized by incorporating with it a condensation product of the kind described as a plasticizer, the organic plastic substances incorporated with such condensation products, also being new compositions.

The hydroxylated conjugated diene polymer reactants employed in the condensation reaction of this invention can be prepared by any suitable method. In accordance with one such method a polymer of a conjugated diene is reacted with hydrogen peroxide or a compound capable of yielding hydrogen peroxide, with or without a solvent, in the presence of a catalyst such as formic acid.

Conjugated diene polymers employed in preparation of the hydroxylated polymer reactant material can be prepared, for example, by mass polymerization or emulsion polymerization and can range from liquids to rubberlike materials. Conjugated diene polymers particularly applicable in the preparation of the hydroxylated polymer reactants include homopolymers of conjugated dienes containing from 4 to 6 carbon atoms per molecule, such as 1,3-butadiene, isoprene, piperylene, methylpentadiene, 2,3-dimethyl-1,3-butadiene, bromoprene, chloroprene, alkoxy derivatives of such conjugated dienes as, for example, methoxy and ethoxy dienes, and cyano derivatives of these dienes, and, also copolymers of such dienes and compounds copolymerizable therewith, such as higher boiling mono-olefins containing the group

for example, styrene, methyl substituted styrenes and the like. These polymers, i. e., prior to hydroxylation, range from liquid materials having a viscosity of 100 Saybolt Furol seconds at 100° F. to rubbery polymers having a Mooney value (ML-4) generally not to exceed 100 and preferably not greater than 50.

In one embodiment of this invention, the hydroxylated polymer reactant employed in carrying out the condensation is derived from a liquid polymer of a conjugated diene, this polymer containing from 4 to 6 carbon atoms and being free from dissolved and/or suspended solid polymers. These liquid diene polymers are characterized by molecular weights within the range of 500–5000 (as determined by the freezing point lowering in benzene) and a viscosity within the limits of 100 and about 6000 Saybolt Furol seconds at 100° F. The unsaturation of these liquid diene polymers is generally within the limits of 0.7 and 0.9 double bonds per diene unit, as determined by Lee, Kolthoff and Mairs, J. Polymer Science 3, No. 1, 66 (1948).

These liquid diene polymers can be produced by any suitable means, one of which involves solution polymerization of the diene in the presence of a finely divided alkali metal catalyst and a hydrocarbon solvent. By another method the liquid diene polymer can be prepared by aqueous emulsion polymerization in the presence of relatively large amounts of mercaptan modifiers, and by still another method it can be produced in the presence of hydrofluoric acid as a catalyst. One method of preparing the liquid polydiene by solution polymerization is disclosed in detail in the copending application, Serial No. 67,098, of W. W. Crouch, filed December 23, 1948, wherein is described the polymerization of a conjugated monomeric diene of about 90 percent purity or higher in the presence of a finely divided alkali metal catalyst and diluent, at a temperature generally within the limits of 60 and 110° C. for a reaction time generally not exceeding 8 hours.

One method for effecting hydroxylation of a liquid diene polymer of the type described hereinabove is set forth in the copending application of J. C. Hillyer and L. O. Edmonds, Serial No. 204,062, filed January 2, 1951. In accordance with that procedure, the liquid polydiene described above is reacted with hydrogen peroxide, in the presence or absence of a solvent, and in the presence of formic acid or a selected lower alkyl ester of formic acid as a catalyst, for a time of from about 1 to 60 hours, and at a temperature of about 50 to 200° F., to effect the desired hydroxylation. In this manner the liquid polymeric diene is reacted so that a portion of the double bonds therein are hydroxylated, two hydroxy groups being added to each double bond reacted. The hydroxylated material may undergo esterification in the presence of formic acid, to give a final product which contains both hydroxy and formoxy groups.

Hydroxylated diene polymer reactants prepared as set forth immediately hereinabove are substantially completely soluble in acetone, have a hydroxyl number in the range from 100 to 400, and a saponification number in the range from 0 to 150. The hydroxyl number can be determined by refluxing a weighed sample of the hydroxylated liquid polydiene with a solution of acetic anhydride in pyridine, adding water, and titrating the excess acetic acid. The hydroxyl number is expressed as milligrams KOH per gram sample. The saponification number is expressed in the same terms and is a measure of the esterification. These hydroxylated liquid polymers generally have an oxygen content in the range of 1–25 weight percent and frequently not more than 15 weight percent.

Alkene oxides advantageously applied in the practice of this invention are those containing from 2 to 5 carbon atoms per molecule such as ethylene oxide, propene oxide, 1,2-epoxy-2-methylpropane (isobutylene oxide), 1,2-epoxybutane, 1,2-epoxy-2-methylbutane, 2,3-epoxypentane, 1,2-epoxy-3-butene (butadiene monoxide), di-epoxybutane (butadiene dioxide), and the like.

It is within the scope of this invention to use any alkaline material that functions as a catalyst in the condensation reaction described herein. Quaternary ammonium hydroxides by which I mean to include alkyl, aryl, aralkyl and alkaryl quaternary ammonium hydroxides, constitute a preferred class of alkaline catalysts employed in carrying out the condensation of this invention. Exemplary of these quarternary ammonium hydroxides are tetraethylammonium hydroxide, benzyltriethylammonium hydroxide, trimethylethylammonium hydroxide, benzyldimethylethylammonium hydroxide, triethylbutylammonium hydroxide, tetramethylammonium hydroxide, trimethyl benzyl ammonium hydroxide, and the like.

In carrying out one embodiment of the condensation of this invention a hydroxylated polymer of a conjugated diene is contacted with an alkene oxide in the presence of an alkaline catalyst, such as a quaternary ammonium hydroxide, at a suitable temperature such as 150–300° F., preferably 200–275° F. for a period to allow sufficient time for the condensation to take place, a period within the range of 0.5–5 hours generally being sufficient. Suitable means for effecting agitation of the reaction mixture is advantageously employed. The condensation reaction is exothermic. In accordance with one method for introducing the reactants into the reaction, the alkene oxide is charged at a controlled rate to a mixture of the hydroxylated polymer and catalyst by means of which the reaction temperature can be maintained at the desired level.

Proportions of catalyst employed in carrying out the condensation reaction are generally within the range of from 0.5 to 10 weight percent based on the amount of hydroxylated conjugated diene polymer reactant charged.

The condensation reaction can be effected in the presence or absence of a solvent or dispersing medium. Materials which can be employed as solvents or dispersing media include paraffinic and cycloparaffinic hydrocarbons such as hexanes, heptanes, octanes, cyclohexane, and methylcyclohexane, and aromatic hydrocarbons such as benzene, toluene, and xylene. When a solvent or dispersing medium is used for effecting the reaction, it is convenient to add the alkene oxide as a solution in a solvent, usually the same material that is employed as a solvent or dispersing medium for the hydroxylated polymer.

The amount of alkene oxide introduced into the condensation reaction is generally expressed in terms of mols per hydroxy equivalent in the hydroxylated polymer. In general, from one to 16 mols alkene oxide per hydroxy equivalent (hydroxy group) is used. The amount of alkene oxide employed is varied depending upon the properties desired in the product and also upon the extent of hydroxylation of the conjugated diolefin polymer. Generally a smaller amount of alkene oxide is used with polymers containing a small amount of oxygen, i. e., a lower degree of hydroxylation, than those with a higher oxygen content.

The average number of hydroxy equivalents in the hydroxylated polymer reactant per diene unit is generally within the range of from 0.0055 to 1.375.

The condensation products of this invention exhibit utility as plasticizers of organic plastic substances containing unsaturated carbon to carbon bonds, by which organic plastic substances it is meant generically to include resins, natural rubber and synthetic rubber-like materials. The amount of the condensation product to be incorporated with the rubber, rubber-like or resin material as a plasticizer therefor is in any case an amount to provide a resulting admixture of desired increased plasticity. Generally an amount of the said plasticizer of from 1 to 25 parts by weight per 100 parts by weight of the material to be plasticized is sufficient, an amount of from 2–15 parts being generally preferred. However, in some instances it might be desirable to use larger amounts, such as up to 50 or 60 parts by weight per 100 parts by weight of the material to be plasticized.

I can incorporate the plasticizer of my invention with the material to be plasticized by any suitable method, such as (1) adding the plasticizer to a synthetic rubber latex and then coagulating same in accordance with latex masterbatch procedure, or (2) introducing the plasticizer on the mill.

My invention is well applied to plasticization of Perbunan rubbers prepared by copolymerizing acrylonitrile and 1,3-butadiene in a range of ratios of 10:90 to 40:60 parts by weight. By incorporating the softener materials of my invention with a Perbunan rubber and vulcanizing the mixture, I am able to prepare rubber products of particularly high swelling and low extractability characteristics, when contacted with hydrocarbons, particularly those comprising organic solvents, gasoline-like materials or jet fuels.

Rubber or rubber-like materials containing the plasticizer of my invention are preferably cured or vulcanized for a period of time in the range of from 20 to 75 minutes. In the accompanying claims, reference to a vulcanizate or product of vulcanization of a rubber or rubber-like material compound with a plasticizer material of my invention means that the vulcanization occurred after admixture of these materials with each other.

This invention is illustrated by way of the following examples:

*Example I*

A sample of liquid polybutadiene prepared by sodium catalyzed polymerization, having a viscosity of 418 Saybolt Furol seconds at 100° F. and a molecular weight of 835 (determined by freezing point lowering in benzene), was hydroxylated with 10 percent aqueous hydrogen peroxide in the presence of formic acid. The ratio of these reactants was one $C_4$ equivalent of the liquid polybutadiene per mol of anhydrous hydrogen peroxide per mol of formic acid. The product had an oxygen content of 10.3 percent by weight.

One hundred fifty grams of the hydroxylated liquid polybutadiene and 3 grams of benzyltrimethylammonium hydroxide (Triton B) were charged to a reactor and 63 grams of ethylene oxide was charged, vapor phase, over a period of 6.5 hours. The temperature was maintained at 200–260° F. At the end of this period 41 grams of ethylene oxide had reacted. A dark brown viscous product was obtained. The amount of ethylene oxide reacted with approximately 1.5 mole per hydroxy equivalent in the hydroxylated liquid polybutadiene.

The hydroxylated liquid polybutadiene-ethylene oxide condensation product was evaluated as a softener in a 74/26 butadiene-acrylonitrile rubber using the following compounding recipe:

|  | Parts by weight |
|---|---|
| Butadiene-acrylonitrile rubber | 100 |
| Philblack A[1] | 60 |
| Zinc oxide | 5 |
| Stearic acid | 1.5 |
| Altax[2] | 1.5 |
| Softener | 10 |
| Sulfur | 1.5 |

[1] Medium abrasion furnace black.
[2] Benzothiazyl disulfide.

A control run was made using the commercial softener, TP-90B (high molecular weight polyether), in the compounding recipe given above.

The compounded stocks were cured 30 minutes at 307° F. and physical properties determined. The following results were obtained:

|  | Experimental Softener | TP-90B |
|---|---|---|
| Unaged Samples: |  |  |
| Stress-strain properties at 80° F.— |  |  |
|  300% modulus, p.s.i. | 2,840 | 2,260 |
|  Tensile, p.s.i. | 3,060 | 2,270 |
|  Elongation, percent | 325 | 345 |
| Percent swelled [1] | 45.1 | 36.8 |
| Percent extracted: |  |  |
|  Weight method [1] | 2.2 | 5.8 |
|  Aliquot method [1] | 2.2 | 5.1 |
| Gehman freeze point, °C | −31 | −38 |
| Compression set, percent | 7.4 | 10.3 |
| Oven aged 24 hours at 212° F.: |  |  |
| Stress-strain properties at 80°— |  |  |
|  Tensile, p.s.i. | 3,280 | 2,940 |
|  Elongation, percent | 270 | 255 |

[1] Swelling tests were made on the cured samples by immersing them in a mixture containing 30 percent toluene and 70 percent isooctane at room temperature (80° F.) for seven days. The percent material extracted was determined by both weight and aliquot methods. In the weight method a sample is weighed prior to making the swelling test, immersed in the extraction liquid for the requisite period, dried, and weighed again. In the aliquot method the quantity of extractable material is determined by evaporating the immersion liquid at the conclusion of the swelling test, drying the residue in an oven at 220° F. for 30 minutes, and weighing.

*Example II*

The hydroxylated liquid polybutadiene-ethylene oxide condensation product described in Example I was evaluated as a softener in a 71/29 butadiene-styrene rubber prepared by emulsion polymerization at 41° F. This rubber had a Mooney value (ML-4) of 55. The following compounding recipe was employed:

|  | Parts by weight |
|---|---|
| Butadiene-styrene rubber | 100 |
| Philblack O[(1)] | 50 |
| Zinc oxide | 3 |
| Stearic acid | 1 |
| Flexamine[(2)] | 1 |
| Softener | 10 |
| Sulfur | 1.75 |
| Santocure[(3)] | 1.0 |

[1] High abrasion furnace black.
[2] Physical mixture containing 65 percent of a complex diarylineketone reaction product and 35 percent of N,N'-diphenyl-p-phenylenediamine.
[3] N-cyclohexyl-2-benzothiazolesulfenamide.

A control run was made using a blend of equal parts of the commercial softeners, Circosol–2XH and Paraflux, in the compounding recipe given above. (Circosol-2XH is a petroleum hydrocarbon softener, containing hydrocarbons of high molecular weight, in the form of a heavy, viscous, transparent, pale green, odorless liquid of low volatility; sp. gr. 0.940; Saybolt Universal viscosity at 100° F., about 2000 seconds. Paraflux is a saturated polymerized hydrocarbon.)

The compounded stocks were cured 30 minutes at 307° F. and physical properties determined. The following results were obtained:

|  | Experimental Softener | Circosol–Paraflux |
|---|---|---|
| Unaged Samples: |  |  |
| Stress-strain properties at 80° F.— |  |  |
|  300 percent modulus, p.s.i. | 1,660 | 1,180 |
|  Tensile, p.s.i. | 4,070 | 3,520 |
|  Elongation, percent | 540 | 600 |
| Stress-strain properties at 200° F.— |  |  |
|  Tensile, p.s.i. | 2,090 | 2,300 |
| Hysteresis, ΔT °F | 65.5 | 66.9 |
| Resilience, percent | 56.6 | 64.0 |
| Flex life, thousands of flexures to failure | 39.7 | 28.1 |
| Shore hardness | 60 | 52 |
| Compression set, percent | 12.5 | 21.8 |
| Compounded Mooney, MS 1½ at 212° F | 45.5 | 40 |
| Extrusion at 250° F.— |  |  |
|  Inches/minute | 37.5 | 38 |
|  Grams/minute | 102 | 105 |
| Hand tack | 8 | 6 |
| T-R freeze point, °C | −46.5 | −51.5 |
| Oven Aged 24 hours at 212° F.: |  |  |
| Stress-strain properties at 80° F.— |  |  |
|  300 percent modulus, p.s.i. | 2,400 | 2,260 |
|  Tensile, p.s.i. | 3,340 | 3,650 |
|  Elongation, percent | 390 | 435 |
| Hysteresis, ΔT °F | 64.5 | 55.1 |
| Resilience, percent | 59.5 | 69.3 |
| Flex life, thousands of flexures to failure | 17.4 | 9.9 |
| Shore hardness | 68 | 62 |

The foregoing examples demonstrate utility of alkene oxide-hydroxylated polydiene compositions of the invention as rubber plasticizers.

As shown by Example I, a rubbery copolymer of 1,3-butadiene and acrylonitrile (Perbunan rubber) in which a condensation product of this invention was employed as a plasticizer, upon subsequent vulcanization, exhibits improved aged and unaged tensile strength and lower extractability than the same rubber in which a commercial plasticizer, or softener, was employed, i. e. TP–90B (a high molecular weight polyether).

As shown by Example II a rubbery copolymer of 1,3-butadiene and styrene in which a condensation product of this invention was employed as a plasticizer, upon subsequent vulcanization, exhibits improvements in flex life, tack, and unaged tensile strength over the same rubber in which a commercial softener, i. e. a Cirsocol—Paraflux blend was employed.

Variation and modification are possible within the scope of the foregoing disclosure and the appended claims to the invention, the essence of which is a process for effecting condensation of an alkene oxide with a hydroxylated polymer of a conjugated diene, and products so produced, and, a method for plasticizing natural rubber, synthetic rubber-like materials, and resins employing such a condensation product as a plasticizer therefor, and rubber and resin compositions so produced.

I claim:

1. A process comprising condensing an alkene oxide with a hydroxylated polymer of a conjugated diene in the presence of a quaternary ammonium hydroxide as a catalyst at a temperature in the range of 150–300° F. in such proportions and for a sufficient time effective to produce a resulting product of condensation, producing said product of condensation, and recovering a resulting product of condensation as product of the process.

2. A process of claim 1 wherein said catalyst is benzyltrimethylammonium hydroxide, said conjugated diene is 1,3-butadiene and said oxide is ethylene oxide.

3. A process of claim 1 wherein said condensation is effected in the presence of a solvent chemically inert to all other materials in the resulting reaction mixture.

4. A process for effecting condensation of an alkene oxide with a hydroxylated polymer of a conjugated diene, comprising contacting an alkene oxide containing from 2–5 carbon atoms per molecule, in an amount defined hereinafter, with a product of hydroxylation of a liquid polymer of a conjugated diene containing from 4–6 carbon atoms, said polymer being free from solid polymers and having a viscosity within the range of 100 to 6000 Saybolt Furol seconds at 100° F., in the presence of a quaternary ammonium hydroxide as a catalyst for a period of from 0.5 to 5 hours and at a temperature within the range of 150–300° F., the said amount of alkene oxide contacted with hydroxylated polymer being from 1–16 mols per hydroxy equivalent in said hydroxylated polymer, and recovering a resulting product of condensation of said oxide and said hydroxylated polymer as a product of the process.

5. A process of claim 4 wherein said catalyst is benzyltrimethylammonium hydroxide, said alkene oxide is ethylene oxide and said conjugated diene is 1,3-butadiene.

6. A process of claim 4 wherein said condensation is effected by charging said alkene oxide to an admixture of said hydroxylated polymer reactant and said catalyst at a controlled rate so as to maintain the temperature of the reaction, which is exothermic, at a predetermined level within said temperature range.

7. A new composition comprising a product of condensation of an alkene oxide and a hydroxylated polymer of a conjugated diene formed by condensing said alkene oxide with said hydroxylated polymer of a conjugated diene in the presence of a quaternary ammonium hydroxide as a catalyst at a temperature in the range of 150–300° F. in such proportions and for a sufficient time effective to produce said resulting product of condensation.

8. As a new composition, a product of condensation of an alkene oxide containing from 2–5 carbon atoms per molecule and a product of hydroxylation of a polymer of a conjugated diene containing from 4–6 carbon atoms per molecule formed by condensing said alkene oxide with said hydroxylated polymer of a conjugated diene in the presence of a quaternary ammonium hydroxide as a catalyst at a temperature in the range of 150–300° F. in such proportions and for a sufficient time effective to produce said resulting product of condensation.

9. As a new composition, a product of condensation of ethylene oxide with a hydroxylated liquid polymer of 1,3-butadiene, the said hydroxylated polymer having an oxygen content within the range of 1 to 25 weight percent formed by condensing said alkene oxide with said hydroxylated polymer of a conjugated diene in the presence of a quaternary ammonium hydroxide as a catalyst at a temperature in the range of 150–300° F. in such proportions and for a sufficient time effective to produce said resulting product of condensation.

10. A process comprising contacting an alkene oxide containing from 2–5 carbon atoms per molecule, in an amount defined hereinafter, with a product of hydroxylation of a liquid polymer of a conjugated diene having a hydroxyl number within the range of from 100 to 400 in the presence of a quaternary ammonium hydroxide as a catalyst for a period of from 0.5 to 5 hours at a temperature within the range of 150–300° F., the said amount of alkene oxide contacted with a hydroxylated polymer being from 1–16 mols per hydroxy equivalent in said hydroxylated polymer, and recovering a resulting product of condensation of said oxide and said hydroxylated polymer as a product of the process.

References Cited in the file of this patent

UNITED STATES PATENTS

| | | |
|---|---|---|
| 2,457,224 | Gresham | Dec. 28, 1948 |
| 2,535,664 | Beaver | Dec. 26, 1950 |
| 2,537,648 | Ambelang | Jan. 9, 1951 |
| 2,543,419 | Niederhauser | Feb. 7, 1951 |
| 2,570,601 | Schmerling | Oct. 9, 1951 |